United States Patent
Bureller

[11] Patent Number: 5,908,271
[45] Date of Patent: Jun. 1, 1999

[54] MACHINING SPINDLE

[75] Inventor: Michel Bureller, Antony, France

[73] Assignee: Recoules (S.A.), Ozoir-la-Ferriere, France

[21] Appl. No.: 09/111,665

[22] Filed: Jul. 8, 1998

[30] Foreign Application Priority Data

Jul. 11, 1997 [FR] France ................................. 97 08853

[51] Int. Cl.[6] .................................................. B23B 47/00
[52] U.S. Cl. ........................................ 408/138; 408/137
[58] Field of Search ................................... 408/137, 138

[56] References Cited

U.S. PATENT DOCUMENTS

| | | | |
|---|---|---|---|
| 1,972,022 | 8/1934 | May ........................................ | 408/137 |
| 3,585,882 | 6/1971 | Miller ...................................... | 408/137 |
| 3,661,470 | 5/1972 | O'Pry ...................................... | 408/137 |
| 4,082,473 | 4/1978 | Bratsos .................................... | 408/137 |
| 4,182,588 | 1/1980 | Burkart et al. .......................... | 408/137 |
| 4,197,041 | 4/1980 | Prewitt .................................... | 408/137 |
| 4,592,681 | 6/1986 | Pennison et al. ....................... | 408/137 |
| 5,090,489 | 2/1992 | Ettori ...................................... | 408/137 |

*Primary Examiner*—Andrea L. Pitts
*Assistant Examiner*—Adesh Bhargava
*Attorney, Agent, or Firm*—Eckert Seamans Cherin & Mellott, LLC

[57] ABSTRACT

A telescopic spindle for a machine tool. The spindle has a sleeve at its rear end and the end of the spindle can slide inside the sleeve over a "compensation" stroke C1, the sleeve being capable of entering inside the body of the machine to travel over a stroke C2, so that the total stroke of the spindle is equal to C1+C2. This serves to reduce the total amount of space taken up by the machine tool.

6 Claims, 2 Drawing Sheets

MACHINING SPINDLE

The present invention relates to a machining spindle for: drilling, boring, countersinking, tapping, etc., capable of being mounted on a grid, with the advance movement and rotary motion thereof being obtained from a single motor via a screw-and-nut assembly. The invention also relates to a machine fitted with such a spindle.

BACKGROUND OF THE INVENTION

In known devices of this kind, rotary motion from an electric or pneumatic motor is transformed into advance movement of the spindle while it continues to be driven in rotation. The advance mechanism is generally constituted by a nut, with the spindle being given a left-hand thread for this purpose.

A system of gearwheels drives the screw or nut in rotation and gives rise to a speed difference between the speed of rotation of the rotating drive system and the speed of rotation of the screw. This speed difference is predetermined by the particular gearwheels selected and enables the spindle to be advanced or retracted by engaging or disengaging the advance gearwheels.

Such advance mechanisms are commonly found in the aviation industry (usually in association with pneumatic motors). Mechanical advance devices are generally associated with an abutment mounted on the spindle, either at its leading end or at its trailing end.

In the configuration of the invention, the abutment is situated at the trailing end of the machine. The abutment is located very specifically at a distance on the spindle that is preadjusted as a function of the stroke that is desired for the spindle. At the end of the stroke, the abutment comes into contact with a stationary or moving element of the machine that serves as a reference, such as a feeler bushing, the body of the machine, etc. By reaction against the internal mechanism, this contact causes the spindle to return automatically. This implies that for a machine with stroke adjustment at the rear of the machine, the space occupied by the machine is equal to the length of the stroke plus the length of the abutment.

Unfortunately, this can be incompatible with the space available for performing specific machining operations, in particular in corners, and in the aviation industry in the vicinity of the junction between the wing structure and the fuselage. The rear end of the spindle can come into contact with the part that is to be machined. As can be seen in FIG. 1, some present machines are unsuitable for performing such machining.

As shown diagrammatically in FIG. 1, if the spindle needs to have a stroke C for performing the desired work, this means that the space occupied by the rear portion is equal to E (sum of the stroke C+length of the abutment). The total space occupied A is equal to E plus the length of the body of the machine plus its forwardly-projecting barrel. This total space requirement is sometimes incompatible with the space available.

OBJECTS AND SUMMARY OF THE INVENTION

An object of the invention is to limit this space requirement by using a telescopic spindle which makes it possible to use the machine in the tightest of locations.

According to the invention, in the machine tool in which the tool-carrying spindle is rotated and driven in translation by a motor via a set of gears, the spindle comprises, going from the head of the tool carrier: a threaded cylindrical first section extended rearwards by a second section of smaller diameter, said end being movable in a sleeve, the sleeve having an outside diameter that is no greater than the diameter of the first section, and an abutment being mounted on the spindle or on the sleeve.

In this way, the telescopic spindle makes it possible to reduce the space required by the machine to the value of a compensation stroke referenced below as C1. Accurate adjustment of the additional stroke C2 is performed by moving the rear abutment on the sleeve or on the rear end of the spindle.

BRIEF DESCRIPTION OF THE DRAWINGS

Other characteristics and advantages of the present invention appear from the following description of a particular embodiment given purely by way of non-limiting example, and with reference to the accompanying drawings, in which.

MORE DETAILED DESCRIPTION

Figure 1:
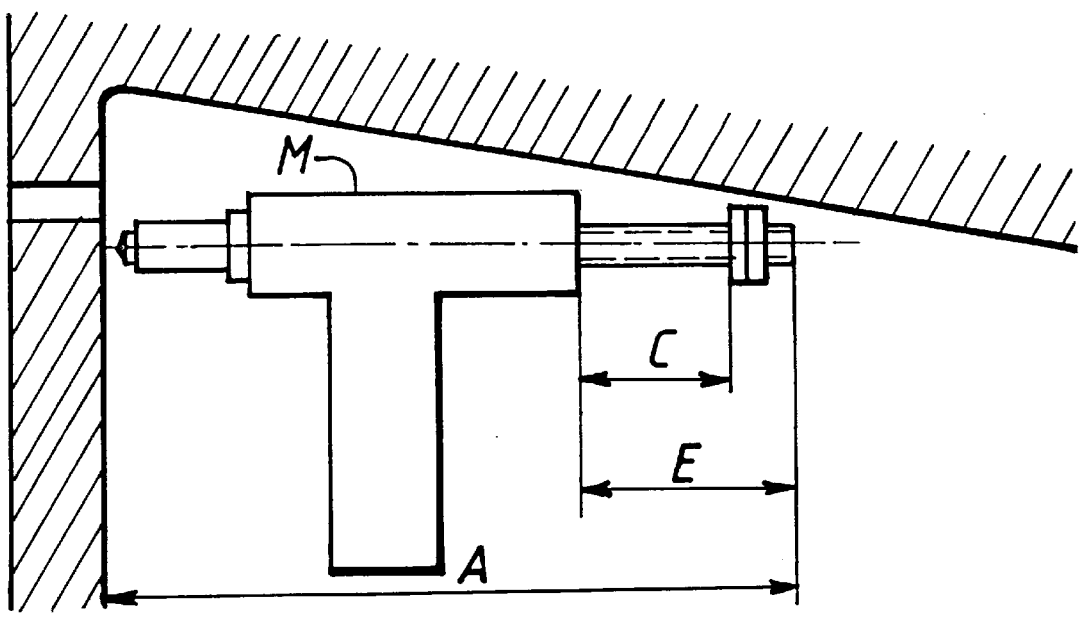
FIG. 1 is a diagram showing the difficulty that can be encountered with prior art machines.
Figure 2:
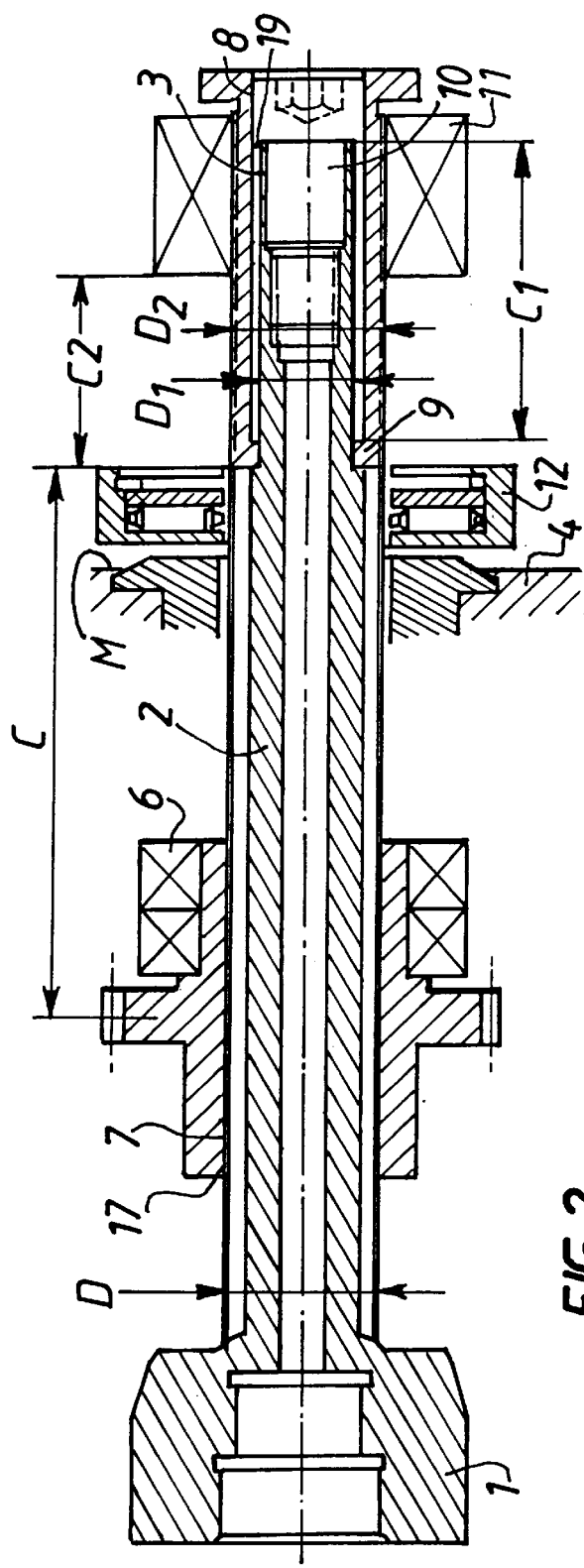
FIG. 2 is a theoretical diagram of a spindle of the invention in its rear position.

In FIG. 2, the spindle is in its rearmost position. The threaded spindle can move over its threaded length through a stroke C which may be broken down into an adjustable stroke C2 plus a compensation stroke C1. In this figure, there can be seen the head of the spindle 1 which is designed to receive a tool, and which is extended towards the rear of the machine M by a threaded cylindrical first section of spindle 2 having a diameter D. Reference 2a identifies a longitudinal groove. In the figure, the machine is shown in part only, insofar as it serves as a reference for the various forward and backward movements. The rear of the machine is to the right in FIGS. 1 and 2. The rod 2 is extended by a tail 3 of diameter D1 that is smaller than the diameter D.

The end of the tail 3 receives a shouldered nut 10, preferably screwed on via a left-hand thread when the tool turns in right-handed manner so as to avoid any accidental loosening. The nut 10 is slidably mounted in the internal cavity of an externally threaded sleeve 8. The outside diameter D2 of the sleeve 8 is no greater than the diameter D of the rod 2 so as to enable it to penetrate inside the machine, as explained below. Preferably, the external thread is a fine-pitched thread so as to receive an abutment 11 whose position, which defines the length of the stroke, can thus be adjusted very accurately.

A gearwheel 7 is mounted on the rod 2 for controlling displacement in translation of the rod 2, the rotary drive gearwheel not being shown for reasons of clarity. To this end, the gearwheel 7 has an inside thread engaged on the thread 17 of the rod 2. The gearwheel is driven in rotation only, and it retains a fixed position inside the body of the machine. By way of example, its rear portion rotates in two ball bearings 6. The body of the machine M is represented by a surface given reference 4. Outside the rod 2 there is mounted an abutment 12 for limiting forward displacement of the micrometer abutment 11. In the example shown, the abutment 12 is a needle abutment secured to a feeler bushing.

Figure 3:
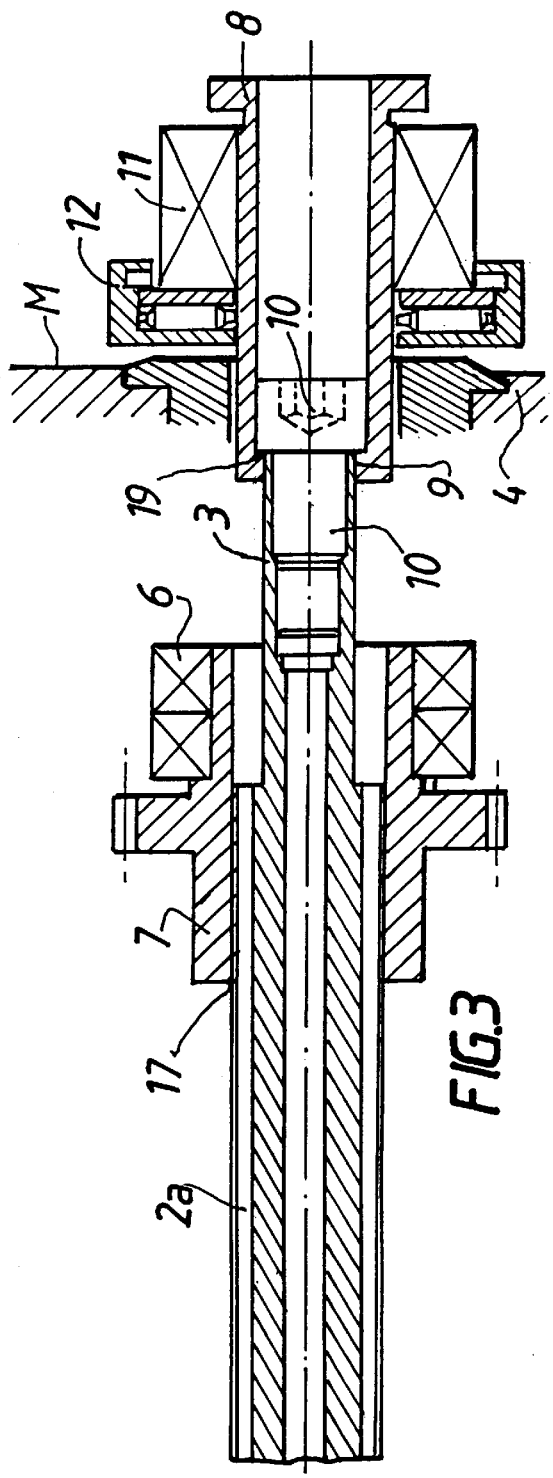
FIG. 3 is a similar view of the spindle in its front position.

The same elements with the same references are to be found in FIG. 3, but after the spindle has been moved forwards relative to the machine.

Starting from the position shown in FIG. 2, when the spindle is set into forward movement by means of the gearwheel 7, the spindle moves to the left of FIG. 2. The rod 2 drives the shouldered nut 10 in rotation and in translation causing it to slide helically inside the sleeve 8 which does not move during this stage. This motion continues until the shoulder 19 of the nut 10 comes into contact with a collar 9 provided at the front portion of the sleeve 8. This stroke C1 as performed by the spindle is referred to as the "compensation" stroke.

As the stroke of the spindle continues, the spindle drives the sleeve 8 into the inside of the body of the machine by virtue of the contact between the bottom surface 19 of the head of the nut 10 and the collar 9 of the sleeve 8. The movement continues until the front face of the abutment 11 comes into contact with the rear face of the abutment 12, thereby stopping forward movement.

The parts are then in the position shown in FIG. 3. If this second stroke is referenced C2, then the total stroke of the front portion of the spindle C is equal to C1+C2. As a result, a total stroke C is obtained which is greater than the individual displacements of the rear portion of the spindle and of the abutment 11, which displacement is no more than C2. This means that less space is occupied at the rear of the machine, which was the object of the invention, with this reduction being the result of the compensation stroke C1.

As mentioned above, the abutment 11 coming into contact against the abutment 12 prevents the gearwheel 7 from rotating via a mechanism inside the machine, and initially the motion of the spindle 2 returns the nut rearwards inside the sleeve 8 which, during this first displacement of length C1, remains stationary. Once the stroke C1 has been completed, the rear shoulder of the section 1 of the spindle is in contact with the front portion of the sleeve 8 and causes it to move backwards through a length C2 such that the assembly returns to its original position as shown in FIG. 2. Naturally, during these displacements, the micrometer abutment 11 remains in a fixed position on the sleeve 8, and during the displacement stroke C2, the nut 10 remains fixed relative to the sleeve 8.

The stroke C can be reduced by placing a spacer wedge (not shown) on the diameter D so as to reduce the stroke C1, if the adjustment of C2 is not sufficient.

Figure 4:
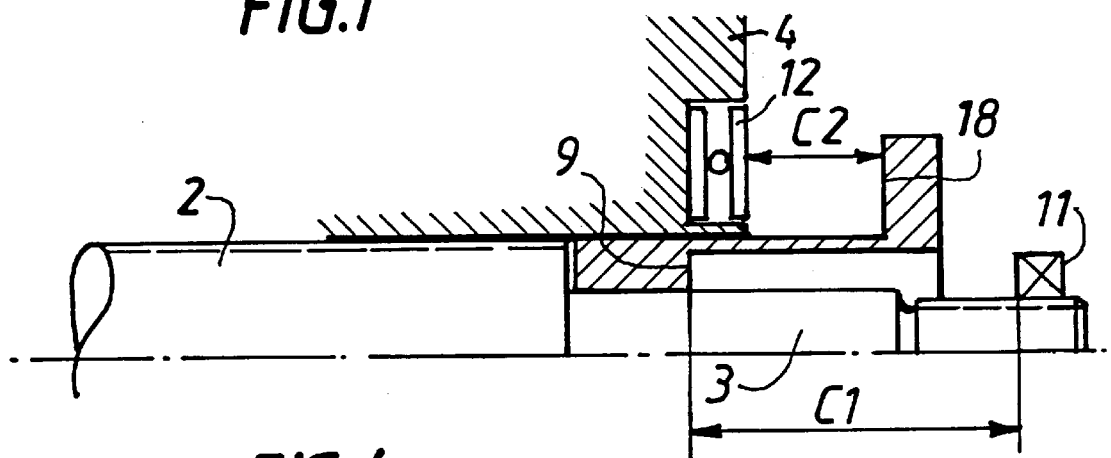
FIG. 4 shows a first variant mounting for the rear portion of the spindle.
Figure 5:
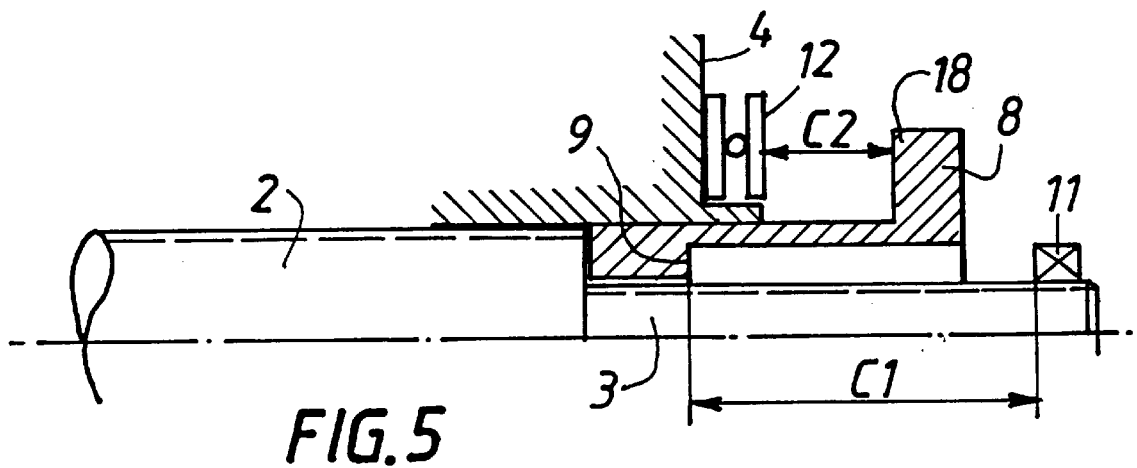
FIG. 5 shows a second variant mounting.

FIGS. 4 and 5 show two variant embodiments of the compensation system. These are half-sections of the rear portion of the spindle. The telescopic assembly principle remains the same, however the nut 10 is omitted and the abutment 11 is no longer mounted on the sleeve 8, but on the rear end of the spindle. The dimensions of the abutment 11 and of the sleeve 8 are such that the abutment 11 can move together with the spindle inside the sleeve 8.

In FIG. 4, the rear end of the rod 2 terminates in a tail of smaller section 3 whose own rear portion is threaded to receive the micrometer abutment 11. The stroke C1 is determined by the distance between the rear face of the collar 9 of the sleeve 8 and the front face of the abutment 11 when the spindle is in the rear position. Similarly, the stroke C2 is determined by the distance, in the same position, between the rear face of the abutment 12 and the front face 18 of the sleeve 8. In this case, the abutment 12 is integrated in the body of the machine M. The abutment 11 is mounted on the spindle. The sleeve 8 is guided on the diameter D1 of the spindle.

In FIG. 5, the structure is the same as in FIG. 4 except that the abutment 12 is mounted over a projection from the body M of the machine and the sleeve is guided on the diameter D of the spindle.

Naturally, numerous variants can be applied, in particular by substituting equivalent technical means, without thereby going beyond the ambit of the invention.

I claim:

1. A spindle for a portable machine tool in which a tool-carrying spindle is rotated and driven in translation by a motor via a set of gears, the spindle comprising, starting from its tool-carrier head, a threaded cylindrical first section of an outside diameter extended rearwards by a second section of smaller diameter, said second section being movable in a sleeve, the sleeve having an outside diameter no greater than the diameter of the first section, an abutment being mounted on one of the spindle and the sleeve, wherein said sleeve is slidably engaged with said spindle.

2. A machining spindle according to claim 1, wherein a shouldered nut is mounted on the end of the second section, wherein said nut slides inside the sleeve.

3. A machining spindle according to claim 1, wherein a stroke of the spindle is made up of a compensation stroke plus a forward stroke of the sleeve.

4. A machining spindle according to claim 2, wherein a forward stroke of the machine is limited by contact between the abutment and an abutment serving as a reference.

5. A machining spindle according to claim 2, wherein the compensation stroke is limited by contact between the nut and a collar on the sleeve.

6. A machining spindle according to claim 3, wherein the abutment is directly mounted at a rear end of the spindle and is movable inside the sleeve over said compensation stroke, the forward stroke being determined by the distance between the abutment and a rear surface of the sleeve.

\* \* \* \* \*